US012686631B2

(12) United States Patent
Oda et al.

(10) Patent No.: US 12,686,631 B2
(45) Date of Patent: Jul. 21, 2026

(54) GLASS AND CRYSTALLIZED GLASS

(71) Applicant: OHARA INC., Kanagawa (JP)

(72) Inventors: Nozomu Oda, Kanagawa (JP);
Toshitaka Yagi, Kanagawa (JP)

(73) Assignee: OHARA INC., Kanagawa (JP)

( * ) Notice: Subject to any disclaimer, the term of this patent is extended or adjusted under 35 U.S.C. 154(b) by 370 days.

(21) Appl. No.: 18/020,069

(22) PCT Filed: Jul. 8, 2021

(86) PCT No.: PCT/JP2021/025762
§ 371 (c)(1),
(2) Date: Feb. 6, 2023

(87) PCT Pub. No.: WO2022/030174
PCT Pub. Date: Feb. 10, 2022

(65) Prior Publication Data
US 2023/0312400 A1 Oct. 5, 2023

(30) Foreign Application Priority Data

Aug. 7, 2020 (JP) ................................. 2020-134653

(51) Int. Cl.
| | |
|---|---|
| *B32B 15/04* | (2006.01) |
| *B32B 17/06* | (2006.01) |
| *C03C 3/085* | (2006.01) |
| *C03C 3/087* | (2006.01) |
| *C03C 3/091* | (2006.01) |
| *C03C 3/093* | (2006.01) |
| *C03C 3/097* | (2006.01) |
| *C03C 10/00* | (2006.01) |

(52) U.S. Cl.
CPC .............. *C03C 10/00* (2013.01); *C03C 3/085* (2013.01); *C03C 3/087* (2013.01); *C03C 3/091* (2013.01); *C03C 3/093* (2013.01); *C03C 3/097* (2013.01); *C03C 2204/00* (2013.01)

(58) Field of Classification Search
CPC .............................. C03C 10/00; C03C 21/002
USPC ................................................. 428/426, 410
See application file for complete search history.

(56) References Cited

U.S. PATENT DOCUMENTS

| | | | | |
|---|---|---|---|---|
| 3,585,054 A | * | 6/1971 | Karstetter | ........... C03C 10/0045 501/4 |
| 4,687,749 A | * | 8/1987 | Beall | ........................ C04B 35/20 501/4 |
| 4,985,375 A | * | 1/1991 | Tanaka | ................ C03C 10/0054 501/5 |
| 5,795,151 A | | 8/1998 | Nonami et al. | |
| 6,306,786 B1 | | 10/2001 | Koyama et al. | |
| 6,429,160 B1 | * | 8/2002 | Nakajima | ........... C03C 10/0045 428/846.8 |

| | | | | |
|---|---|---|---|---|
| 6,495,480 B1 | * | 12/2002 | Goto | ........................ C03C 17/00 428/846.9 |
| 6,534,161 B1 | * | 3/2003 | Kawakami | .............. C03C 3/064 501/118 |
| 6,627,566 B1 | * | 9/2003 | Zou | .................... G11B 5/73921 428/846.9 |
| 9,908,809 B2 | * | 3/2018 | Momono | ............ C03C 10/0045 |
| 2002/0028739 A1 | * | 3/2002 | Beall | ..................... C03C 13/046 501/5 |
| 2002/0032113 A1 | * | 3/2002 | Nakajima | ........... C03C 10/0045 501/10 |
| 2002/0049128 A1 | | 4/2002 | Koyama et al. | |
| 2003/0228968 A1 | * | 12/2003 | Usui | ..................... C04B 35/195 501/55 |
| 2004/0072669 A1 | * | 4/2004 | Beall | ..................... C03C 4/0071 501/5 |
| 2007/0281850 A1 | * | 12/2007 | Beall | .................. C03C 10/0045 501/10 |
| 2011/0092353 A1 | * | 4/2011 | Amin | ...................... C03C 10/16 501/3 |
| 2011/0111944 A1 | * | 5/2011 | Hsu | ......................... C03C 1/002 65/33.3 |
| 2011/0135964 A1 | * | 6/2011 | Yagi | ....................... C03C 3/097 65/33.1 |
| 2013/0011695 A1 | | 1/2013 | Yagi et al. | |
| 2014/0134397 A1 | * | 5/2014 | Amin | .................. C03C 10/0045 428/141 |
| 2014/0141285 A1 | * | 5/2014 | Momono | ............ C03C 10/0045 501/63 |
| 2014/0194270 A1 | * | 7/2014 | Shiratori | ............. C03C 10/0027 501/32 |

(Continued)

FOREIGN PATENT DOCUMENTS

| | | |
|---|---|---|
| CN | 106242299 A | 12/2016 |
| CN | 110267924 A | 9/2019 |

(Continued)

OTHER PUBLICATIONS

International Search Report issued on Sep. 21, 2021 for PCT application No. PCT/JP2021/025762.
International Preliminary Report On Patentability issued on Feb. 7, 2023 for PCT application No. PCT/JP2021/025762.
Search Report issued on Mar. 17, 2025 for EP application No. 21853967.4.

*Primary Examiner* — Lauren R Colgan

(74) *Attorney, Agent, or Firm* — Li & Cai Intellectual Property Office

(57) ABSTRACT

Glass and crystallized glass of the glass, the glass containing, by mass % in terms of an oxide, 40.0 to 55.0% of a $SiO_2$ component, 10.0 to 30.0% of an $Al_2O_3$ component, 10.0 to 30.0% of an MgO component, 5.0 to 15.0% of a $TiO_2$ component, and more than 0 to 8.0% of an $Na_2O$ component.

4 Claims, No Drawings

(56)                    References Cited

U.S. PATENT DOCUMENTS

| 2016/0355434 A1 | 12/2016 | Momono | |
| 2017/0233287 A1* | 8/2017 | Li | C03C 3/089 |
| | | | 428/172 |
| 2018/0088268 A1* | 3/2018 | Kondo | G02B 5/0242 |
| 2019/0375680 A1* | 12/2019 | Yagi | C03C 3/087 |
| 2020/0131079 A1* | 4/2020 | Yagi | C03C 10/0018 |
| 2024/0375994 A1* | 11/2024 | Oda | C03C 10/0045 |

FOREIGN PATENT DOCUMENTS

| CN | 110799465 A | 2/2020 |
| JP | 6452632 A | 2/1989 |
| JP | 8206190 A | 8/1996 |
| JP | 11302033 A | 11/1999 |
| JP | 200148581 A | 2/2001 |
| JP | 2009538819 A | 11/2009 |
| JP | 2011201758 A | 10/2011 |
| JP | 201323420 A | 2/2013 |
| JP | 2014114200 A | 6/2014 |
| JP | 2019182719 A | 10/2019 |
| WO | WO2007142922 A2 | 12/2007 |

* cited by examiner

GLASS AND CRYSTALLIZED GLASS

FIELD OF THE DISCLOSURE

The present disclosure relates to glass and crystallized glass having novel compositions.

BACKGROUND OF THE DISCLOSURE

Conventionally, glass has been used as a cover glass for protecting the display of portable electronic devices such as smartphones and tablet PCs, and as a protector for protecting the lens of in-vehicle optical devices. In recent years, there is a demand for a use in a housing or the like serving as an exterior of an electronic device. There is an increasing demand for a material having a high strength so that such a device can withstand a severe use.

Crystallized glass is a type of glass having increased strength. The crystallized glass is obtained by precipitating crystals inside of the glass, and has a superior mechanical strength to glass.

Patent Document 1 discloses a material composition of a crystallized glass substrate for a magnetic information storage medium. Patent Document 1 states that a glass-ceramic substrate having a crystal phase such as enstatite has a high Young's modulus that allows it to be used in an application involving high-speed rotation, and thus is suitable for a magnetic information storage medium.

PRIOR ART DOCUMENT

Patent Document

[Patent Document 1] Japanese Unexamined Patent Application Publication No. 2001-048581

SUMMARY OF THE DISCLOSURE

An object of the present disclosure is to provide a high-strength crystallized glass and a glass as a raw material of the crystallized glass.

The present inventors, through intensive studies to solve the above problems, found that crystallized glass obtained by crystallizing glass having a predetermined composition has high hardness, and furthermore, by performing chemical strengthening, the hardness can be further increased. Thus, the present inventors completed the present invention. Contents of the present disclosure are specifically described below.

(Configuration 1)
Glass, containing
40.0 to 55.0% of a $SiO_2$ component,
10.0 to 30.0% of an $Al_2O_3$ component,
10.0 to 30.0% of an MgO component,
5.0 to 15.0% of a $TiO_2$ component, and
more than 0 to 8.0% of an $Na_2O$ component,
by mass % in terms of an oxide.
(Configuration 2)
The glass according to Configuration 1, containing
0 to 5.0% of a $B_2O_3$ component,
0 to 5.0% of a $P_2O_5$ component,
0 to 4.0% of an $Li_2O$ component,
0 to 5.0% of a $K_2O$ component,
0 to 5.0% of a CaO component,
0 to 5.0% of an SrO component,
0 to 5.0% of a BaO component,
0 to 5.0% of a ZnO component, 0 to 8.0% of a $ZrO_2$ component, and
0 to 1.0% of an $Sb_2O_3$ component,
by mass % in terms of an oxide.
(Configuration 3)
Crystallized glass obtained by crystallizing the glass according to Configuration 1 or 2.
(Configuration 4)
The crystallized glass according to Configuration 3, containing, as a main crystal phase, one or more selected from $MgSiO_3$, $MgTi_2O_5$ and solid solutions thereof.
(Configuration 5)
The crystallized glass according to Configuration 3 or 4, in which the crystallized glass is strengthened glass having a compressive stress layer in a surface of the crystallized glass.

According to the present disclosure, it is possible to obtain a crystallized glass having a high strength and glass used as the raw material for the crystallized glass.

The high-strength crystallized glass and strengthened crystallized glass according to the present disclosure can be used for a protective member and the like of a device. The crystallized glass and strengthened crystallized glass according to the present disclosure may be utilized as a cover glass or a housing of a smartphone, a member of a portable electronic device such as a tablet PC and a wearable terminal, and a protective protector, a member of a substrate for a head-up display, or the like used in a transport vehicle such as a car and an airplane. The crystallized glass and strengthened crystallized glass according to the present disclosure can also be used for other electronic devices and machinery, a building member, a member for a solar panel, a member for a projector, and a cover glass (windshield) for eyeglasses and a watch, for example.

DETAILED DESCRIPTION OF THE EXEMPLARY EMBODIMENTS

Embodiments and examples of according to the present disclosure will be described below in detail, but the present disclosure is not limited to the following embodiments and examples, and may be implemented with appropriate changes within the scope of the object of the present disclosure.

Crystallized glass can be obtained by subjecting glass to heat treatment to precipitate crystals inside the glass. Generally, the crystal phase of the crystallized glass is determined by using a peak angle appearing in an X-ray diffraction pattern in X-ray diffraction analysis, and by using TEMEDX if necessary.

The crystallized glass of the present disclosure contains, for example, $MgSiO_3$, $MgTi_2O_5$, $Mg_2SiO_4$, $Na_2TiSiO_5$, $MgAl_2O_4$, $Mg_2Al_2Si_3O_{12}$ or solid solutions thereof, as a crystal phase. Preferably, the crystallized glass contains one or more selected from $MgSiO_3$, $MgTi_2O_5$, and solid solutions thereof, as the main crystal phase. As a result of having such a main crystal phase, the crystallized glass has high hardness.

The "main crystal phase" as used herein corresponds to a crystal phase contained in the largest amount in the crystallized glass, as determined from the peak of the X-ray diffraction pattern.

When the content of a constituent component of the glass and the crystallized glass (hereinafter, simply referred to as "glass") is described, "by mass % in terms of an oxide" means, if it is assumed that all the constituent components included in the glass are dissolved and converted into oxides, when a total amount of the oxides is 100 mass %, an amount of oxides in each of the components contained in the glass is expressed by mass %. As used herein, a content of each component is expressed as "by mass % in terms of an oxide", unless otherwise specified.

As used herein, "A % to B %" represents A % or more and B % or less. Further, "0" in "containing 0 to C %" refers to a content of 0%.

Hereinafter, the composition range of each component constituting the glass of the present disclosure will be specifically described.

The $SiO_2$ component is an essential component forming a glass network structure. The lower limit of the content of the $SiO_2$ component may be, for example, 40.0% or more, 41.0% or more, or 42.0% or more. The upper limit of the content of the $SiO_2$ component may be, for example, 55.0% or less, 50.0% or less, 49.0% or less, or 48.0% or less.

Similarly to $SiO_2$, the $Al_2O_3$ component is an essential component that forms the glass network structure and may serve as a component constituting a crystal phase by heat treatment of glass yet to be crystallized. Also, the $Al_2O_3$ component contributes to the improvement of mechanical strength. The lower limit of the content of the $Al_2O_3$ component may be, for example, 10.0% or more, 13.5% or more, or 15.0% or more. The upper limit of the content of the $Al_2O_3$ component may be, for example, 30.0% or less, 25.0% or less, or 23.0% or less.

The MgO component is one of the components that may constitute the crystal phase and is an essential component. Also, the MgO component contributes to the improvement of mechanical strength. The lower limit of the content of the MgO component may be, for example, 10.0% or more, 13.5% or more, or 15.0% or more. The upper limit of the content of the MgO component may be, for example, 30.0% or less, 25.0% or less, or 23.0% or less.

The $TiO_2$ component is an essential component that plays a role of nucleation for precipitating crystals. Also, the $TiO_2$ component contributes to the improvement of mechanical strength. The lower limit of the content of the $TiO_2$ component may be, for example, 5.0% or more, 6.0% or more, or 7.0% or more. The upper limit of the content of the $TiO_2$ component may be, for example, 15.0% or less, 14.0% or less, or 13.0% or less.

The $Na_2O$ component is an essential component involved in chemical strengthening. Also, the $Na_2O$ component contributes to the improvement of mechanical strength. The lower limit of the content of the $Na_2O$ component may be, for example, more than 0%, 0.5% or more, 1.0% or more, 2.0% or more, or 3.0% or more.

If the $Na_2O$ component is contained in a large amount, the obtained glass undergoes devitrification, phase-separation, or becomes non-uniform. Therefore, the upper limit of the content of the $Na_2O$ component may be, for example, 8.0% or less, 6.0% or less, 5.0% or less, or 4.5% or less.

$B_2O_3$ components and $P_2O_5$ components can be added as optional components. The optional components may or may not be contained. The content of these components may be 0% or more.

The upper limit of the content of each of these components may be, for example, 5.0% or less, 3.0% or less, or 2.0% or less. The content of the $B_2O_3$ component may be 0 to less than 2.0% or 0 to 1.0%.

The $Li_2O$ component is an optional component involved in chemical strengthening. Also, the $Li_2O$ component contributes to the improvement of mechanical strength.

If the $Li_2O$ component is contained in a large amount, devitrification, phase-separation, or non-uniformity occurs. Therefore, the upper limit of the content of the $Li_2O$ component may be, for example, 4.0% or less, 3.0% or less, 2.0% or less, or 1.0% or less.

Both the $Na_2O$ component and the $Li_2O$ component are involved in chemical strengthening, but if the content is large, the devitrification property deteriorates, and so the total content of these components is preferably 5.0% or less, and more preferably, 4.0% or less.

The $K_2O$ component, the CaO component, the SrO component, the BaO component, and the ZnO component can be added as optional components. The upper limit of the content of each of these components may be, for example, 5.0% or less, 3.0% or less, or 2.0% or less.

The $ZrO_2$ component is an optional component that can contribute to forming nuclei for precipitating crystals. The upper limit of the content of the $ZrO_2$ component can be, for example, 8.0% or less, 5.0% or less, or 3.0% or less.

As long as the effect of the present disclosure is not impaired, the glass may contain the $Gd_2O_3$ component, the $TeO_2$ component, the FeO component, the $La_2O_3$ component, the $Y_2O_3$ component, the $Nb_2O_5$ component, the $Ta_2O_5$ component, and the $WO_3$ component as optional components. The content of each component may be 0 to 2.0%, or 0.5 to 1.0%.

The glass may contain, as a clarifying agent, from 0% to 2.0%, preferably from 0.005% to 1.0%, and more preferably from 0.01% to 0.5% of one or more selected from an $Sb_2O_3$ component, an $SnO_2$ component, and a $CeO_2$ component.

There is a tendency to avoid the use of components including Pb, Th, Cd, Tl, Os, Be, and Se, which are considered in recent years to be harmful chemical substances, and therefore, it is preferable that such components are substantially not contained.

The above-mentioned blending amounts may be appropriately combined.

A total of the $SiO_2$ component, the $Al_2O_3$ component, the MgO component, the $TiO_2$ component, and the $Na_2O$ component may be 80.0% or more, 85.0% or more, 90.0% or more, or 92.0% or more.

A compressive stress layer is provided in a surface of the strengthened crystallized glass according to the present disclosure. Assuming that an outermost surface has a depth of zero, the compressive stress of the outermost surface (surface compressive stress) is CS. DOLzero denotes a depth of the compressive stress layer when the compressive stress is 0 MPa.

By forming a compressive stress layer on the surface, it is possible to prevent a crack from growing and allow the mechanical strength to increase. The surface compressive stress value (CS) of the compressive stress layer is preferably 150 MPa or more, more preferably 200 MPa or more, still more preferably 500 MPa or more, and yet still more preferably 600 MPa or more. The central tensile stress (CT) can be, for example, 30 MPa or less, or 25 MPa or less.

The compressive stress layer having a large depth can prevent the crack from growing and the substrate from breaking, even if a deep crack occurs on the surface. The depth (DOLzero) of the compressive stress layer is preferably 25 μm or more, more preferably 30 μm or more, and yet still more preferably 40 μm or more.

A lower limit of a thickness of the glass substrate is preferably 0.10 mm or more, more preferably 0.20 mm or more, and still more preferably 0.40 mm or more, and an upper limit of the thickness of the glass substrate is preferably 10.00 mm or less, more preferably 5.00 mm or less, still more preferably 1.00 mm or less, yet still more preferably 0.90 mm or less, and further yet more preferably 0.80 mm or less.

The crystallized glass or strengthened crystallized glass has a Vickers hardness (Hv) measured in Examples of preferably 700 or more, more preferably 800 or more, and still more preferably 900 or more. When such impact resistance is provided, the crystallized glass or strengthened crystallized glass can withstand an impact generated when dropped if used as a protective member.

The glass and crystallized glass of the present disclosure may be produced by the following method, for example.

The raw materials are uniformly mixed, and the resulting mixture is melted and stirred for homogenization, then molded and slowly cooled to produce glass. Next, the glass is crystallized to manufacture crystallized glass. Further, by chemically strengthening crystallized glass as a base material, a strengthened crystallized glass can be formed.

The glass is subjected to heat treatment to precipitate crystals in the glass. The heat treatment may be performed at a one-stage temperature or a two-stage temperature.

The two-stage heat treatment includes a nucleation step of firstly treating the raw glass by heat at a first temperature and a crystal growth step of treating, after the nucleation step, the glass by heat at a second temperature higher than that in the nucleation step.

In the one-stage heat treatment, the nucleation step and the crystal growth step are continuously performed at the one-stage temperature. Typically, the temperature is raised to a predetermined heat treatment temperature, is maintained for a certain period of time after reaching the predetermined heat treatment temperature, and is then lowered.

When the heat treatment is performed at the one-stage temperature, the heat treatment temperature is preferably 600° C. to 1000° C., and more preferably 750° C. to 900° C. A retention time at the heat treatment temperature is preferably 30 minutes to 500 minutes, and more preferably 60 minutes to 300 minutes.

An example of a method for forming the compressive stress layer includes a chemical strengthening method in which an alkaline component present in a surface layer of the crystallized glass substrate is subject to exchange reaction with an alkaline component with a larger ionic radius to form a compressive stress layer on the surface layer. Other examples include a heat strengthening method in which the crystallized glass substrate is heated, and then, is quenched and an ion implantation method in which ions are implanted into the surface layer of the crystallized glass substrate.

The chemical strengthening method may be implemented according to the following steps, for example. A crystallized glass is contacted to or immersed in a molten salt of a salt containing potassium or sodium, for example, potassium nitrate ($KNO_3$), sodium nitrate ($NaNO_3$) or a mixed salt or a complex salt thereof. The treatment of contacting or immersing the crystallized glass to or in the molten salt (chemical strengthening treatment) may be performed in one stage or in two stages.

For example, in the case of the two-stage chemical strengthening treatment, firstly, the glass is contacted to or immersed in a sodium salt or a mixed salt of potassium and sodium heated at 350° C. to 550° C. for 1 to 1440 minutes. Subsequently, secondly, the resultant glass is contacted to or immersed in a potassium salt or a mixed salt of potassium and sodium heated at 350° C. to 550° C. for 1 to 1440 minutes.

In the case of the one-stage chemical strengthening treatment, the glass is contacted to or immersed in a salt containing potassium or sodium heated at 350° C. to 550° C. or a mixed salt thereof for 1 to 1440 minutes, preferably 90 to 600 minutes.

The heat strengthening method is not particularly limited, but, for example, the crystallized glass may be heated to 300° C. to 600° C., and thereafter, be applied to rapid cooling such as water cooling and/or air cooling to form the compressive stress layer by a temperature difference between the surface and the inside of the crystallized glass substrate. When the heat strengthening method is combined with the above chemical treatment method, it is possible to more effectively form the compressive stress layer.

The ion implantation method is not particularly limited, but, for example, an arbitrary ion may be collided on the surface of the crystallized glass (base material) with an acceleration energy and an acceleration voltage that would not destroy the surface of the base material to implant the ions into the surface of the base material. Thereafter, by performing heat treatment as necessary, it is possible to form the compressive stress layer on the surface in a similar manner as in the other methods.

EXAMPLES

Examples 1 to 36 and Comparative Examples 1 and 2

1. Manufacture of Glass and Crystallized Glass

Raw materials such as oxides, hydroxides, carbonates, nitrates, fluorides, chlorides, and metaphosphate compounds corresponding to a raw material of each component of glass were selected, and the selected raw materials were weighed and mixed uniformly to have the compositions (mass %) described in Table 1. Comparative Example 1 corresponds to Example 6 of Patent Document 1.

Next, the mixed raw materials were fed into a platinum crucible and melted in an electric furnace in a temperature range from 1300° C. to 1540° C. depending on the degree of meltability of the glass composition. Subsequently, the molten glass was stirred and homogenized, cast into a mold, and slowly cooled to prepare glass.

The obtained glass was subjected to one-stage heat treatment using the crystallization temperatures and crystallization times described in Table 1 to prepare crystallized glass. The crystal phase of the obtained crystallized glass was confirmed by X-ray diffraction. Table 1 shows the confirmed crystal phases and the retention times at temperatures during heat treatment.

2. Chemical Strengthening of Crystallized Glass

The crystallized glass thus prepared was cut and ground. In Examples 1 to 34 and Comparative Examples, the crystallized glass was polished so as to have opposing surfaces parallel to each other and a thickness of 10 mm. In Examples 35 and 36, the crystallized glass was polished so as to have opposing surfaces parallel to each other and a thickness of 1.00 mm. As a result, a crystallized glass substrate was obtained.

In Examples 1 to 11, 13 to 29, 35 and 36, and Comparative Examples 1 and 2, the crystallized glass substrate was immersed in a $KNO_3$ salt bath at 500° C. for 8 hours (480 minutes) to perform chemical strengthening and obtain a strengthened crystallized glass.

3. Evaluation of Crystallized Glass and Strengthened Crystallized Glass

The crystallized glass and strengthened crystallized glass were evaluated as follows.

(1) Vickers Hardness Measurement

Table 2 shows the Vickers hardness (Hv) of the crystallized glass (before strengthening) and the strengthened crystallized glass (after strengthening). A square pyramid diamond indenter having an angle of 136° between opposing sides was used to measure the Vickers hardness as a value obtained by dividing the load when the pyramid-shaped depression was formed on the test surface by the surface area ($mm^2$) calculated from the length of the depression. The measurement was performed with a test load of 200 gf and a holding time of 15 seconds using a micro Vickers hardness tester HMV-G21D manufactured by Shimadzu Corporation.

(2) Stress Measurement

Stress measurement was performed for the strengthened crystallized glass substrates obtained in Examples 1 to 9, 11, 13, 14, 16, 18 to 21, 35, and 36. The results are shown in Table 2. The surface compressive stress value (CS) was measured by using a glass surface stress meter FSM-6000LE series manufactured by Orihara Manufacturing Co., LTD. As a light source of the measurement device used in the CS measurement, a light source having a wavelength of 596 nm was selected. As the refractive index used in the CS measurement, a refractive index value at 596 nm was used. It is noted that the refractive index value at a wavelength of 596 nm was calculated by using a quadratic approximation expression from the measured values of the refractive index at the wavelengths of a C-line, a d-line, an F-line, and a g-line according to the V-block method specified in JIS B 7071-2: 2018.

A value of a photoelastic constant at a wavelength of 596 nm used for the CS measurement was calculated from the measured values of the photoelastic constants at a wavelength of 435.8 nm, a wavelength of 546.1 nm, and a wavelength of 643.9 nm by using a quadratic approximation expression.

A depth DOLzero (μm) and a central tensile stress (CT) of the compressive stress layer was measured by using a scattered light photoelastic stress meter SLP-1000. Regarding a wavelength of the measurement light source used for the DOLzero and the CT measurement, a light source having a wavelength of 640 nm was selected.

A value of a refractive index at 640 nm was used as a refractive index used in the DOLzero and the CT measurement. It is noted that the refractive index value at a wavelength of 640 nm was calculated by using a quadratic approximation expression from the measured values of the refractive index at the wavelengths of a C-line, a d-line, an F-line, and a g-line according to the V-block method specified in JIS B 7071-2: 2018.

A value of the photoelastic constant at 640 nm used for measurement used for the DOLzero and the CT measurement was calculated from the measured values of the photoelastic constants at a wavelength of 435.8 nm, a wavelength of 546.1 nm, and a wavelength of 643.9 nm by using a quadratic approximation expression.

(3) Fracture Toughness

The fracture toughness of the crystallized glass substrates obtained in Examples 18 and 21 and Comparative Example 1 was measured before and after chemical strengthening. The results are shown in Table 3. The measurement of fracture toughness was performed with a test load of 1 kgf and a holding time of 15 seconds using a micro Vickers hardness tester HMV-G21D manufactured by Shimadzu Corporation.

As shown in Table 2, the crystallized glass of Examples was chemically strengthened and had a compressive stress layer formed on the surface and an increased Vickers hardness.

On the other hand, in Comparative Examples 1 and 2, even after immersion in a $KNO_3$ salt bath at 500° C. for 8 hours, the Vickers hardness did not increase, indicating that the glass of Comparative Examples 1 and 2 was not chemically strengthened and had no compressive stress layer. Rather, immersion in the salt bath roughened the surface and lowered the Vickers hardness.

As shown in Table 3, for the crystallized glass of Examples 18 and 21, chemically strengthening increased the fracture toughness. In Comparative Example 1, the fracture toughness did not change because the crystallized glass was not chemically strengthened. If the fracture toughness is high, the growth of cracks can be prevented.

TABLE 1

| Examples | Composition (mass %) | | | | | | | | | | | | | | | Crystallization temperature | Crystallization time | Crystal phase |
|---|---|---|---|---|---|---|---|---|---|---|---|---|---|---|---|---|---|---|
| | SiO₂ | Al₂O₃ | B₂O₃ | P₂O₅ | Li₂O | Na₂O | K₂O | MgO | CaO | SrO | BaO | ZnO | TiO₂ | ZrO₂ | Sb₂O₃ | | | |
| 1 | 46.00 | 18.30 | | | | 4.00 | | 17.30 | 1.00 | 1.00 | 2.40 | | 9.60 | | 0.40 | 850°C | 360 min | MgSiO₃, MgTi₂O₅ |
| 2 | 46.18 | 18.37 | | | | 4.02 | | 17.37 | 1.00 | 1.00 | 2.4 | | 9.64 | | | 800°C | 360 min | MgSiO₃, |
| 3 | 46.14 | 18.36 | | | | 4.01 | | 17.35 | 1.00 | 1.00 | 2.41 | | 9.63 | | 0.10 | 850°C | 360 min | MgSiO₃, MgTi₂O₅ |
| 4 | 43.29 | 19.32 | | | | 4.22 | | 18.27 | 1.06 | 1.06 | 2.53 | | 10.14 | | 0.11 | 850°C | 360 min | MgSiO₃, MgTi₂O₅ |
| 5 | 48.71 | 17.48 | | | | 3.82 | | 16.52 | 0.96 | 0.96 | 2.29 | | 9.17 | | 0.10 | 850°C | 360 min | MgSiO₃, MgTi₂O₅, BaAl₂SiO₈ |
| 6 | 48.57 | 14.04 | | | | 4.22 | | 18.27 | 1.06 | 1.06 | 2.53 | | 10.14 | | 0.11 | 800°C | 360 min | MgSiO₃, |
| 7 | 43.94 | 22.25 | | | | 3.82 | | 16.52 | 0.96 | 0.96 | 2.29 | | 9.17 | | 0.10 | 850°C | 360 min | MgSiO₃, MgTi₂O₅ |
| 8 | 47.57 | 18.92 | | | | 4.14 | | 14.79 | 1.03 | 1.03 | 2.48 | | 9.93 | | 0.10 | 800°C | 360 min | MgSiO₃, |
| 9 | 44.79 | 17.82 | | | | 3.89 | | 19.77 | 0.97 | 0.97 | 2.34 | | 9.35 | | 0.10 | 850°C | 360 min | MgSiO₃, MgTi₂O₅ |
| 10 | 47.57 | 18.92 | | | | 4.14 | | 17.89 | 1.03 | 1.03 | 2.48 | | 6.83 | | 0.10 | 850°C | 360 min | MgSiO₃, |
| 11 | 44.79 | 17.82 | | | | 3.89 | | 16.85 | 0.97 | 0.97 | 2.34 | | 12.27 | | 0.10 | 850°C | 360 min | MgSiO₃, MgTi₂O₅ |
| 12 | 45.23 | 17.99 | | | | 5.90 | | 17.01 | 0.98 | 0.98 | 2.36 | | 9.44 | | 0.10 | 850°C | 360 min | MgSiO₃, Mg₂SiO₄ |
| 13 | 43.13 | 18.36 | | | | 4.01 | | 20.36 | 1.00 | 1.00 | 2.41 | | 9.63 | | 0.10 | 850°C | 360 min | MgSiO₃, Mg₂SiO₄, BaAl₂SiO₈ |
| 14 | 44.19 | 18.81 | | | | 4.11 | | 20.86 | 1.03 | 1.03 | | | 9.87 | | 0.10 | 850°C | 360 min | MgSiO₃, Mg₂SiO₄ |
| 15 | 46.14 | 15.35 | | | | 4.01 | | 20.36 | 1.00 | 1.00 | 2.41 | | 9.63 | | 0.10 | 850°C | 360 min | MgSiO₃, Mg₂SiO₄ |
| 16 | 43.00 | 21.00 | | | | 4.00 | | 20.30 | 1.00 | 1.00 | | | 9.60 | | 0.10 | 850°C | 360 min | MgSiO₃, |
| 17 | 41.00 | 23.00 | | | | 4.00 | | 20.30 | 1.00 | 1.00 | | | 9.60 | | 0.10 | 850°C | 360 min | MgSiO₃, MgTi₂O₅, MgAl₂O₄ |
| 18 | 43.13 | 21.06 | | | | 4.01 | | 18.66 | 2.4 | 1.00 | | | 9.63 | | 0.10 | 850°C | 360 min | MgSiO₃, |
| 19 | 42.66 | 20.83 | | | | 3.97 | | 18.45 | 0.99 | 3.47 | | | 9.52 | | 0.10 | 850°C | 360 min | MgSiO₃, MgTi₂O₅ |
| 20 | 42.16 | 20.59 | | | | 3.92 | | 18.24 | 0.98 | 0.98 | 3.63 | | 9.41 | | 0.10 | 850°C | 360 min | MgSiO₃, MgTi₂O₅, SrAl₂SiO₈ |
| 21 | 42.87 | 20.94 | | | | 3.99 | | 18.54 | 1.00 | 1.00 | | 1.99 | 9.57 | | 0.10 | 850°C | 360 min | MgSiO₃, MgTi₂O₅, BaAl₂SiO₈ |
| 22 | 42.62 | 20.81 | | | | 3.96 | | 20.12 | 0.99 | 0.99 | | | 7.93 | 2.48 | 0.10 | 850°C | 360 min | MgSiO₃, MgTi₂O₅ |
| 23 | 42.49 | 20.75 | | | | 3.95 | | 18.38 | 0.99 | 0.99 | | 1.98 | 7.91 | 2.47 | 0.10 | 850°C | 360 min | MgSiO₃, MgTi₂O₅, Na₂TiSiO₅, MgSiO₃ |

TABLE 1-continued

| Examples | Composition (mass %) | | | | | | | | | | | | | | | Crystallization temperature | Crystallization time | Crystal phase |
|---|---|---|---|---|---|---|---|---|---|---|---|---|---|---|---|---|---|---|
| | SiO2 | Al2O3 | B2O3 | P2O5 | Li2O | Na2O | K2O | MgO | CaO | SrO | BaO | ZnO | TiO2 | ZrO2 | Sb2O3 | | | |
| 24 | 41.00 | 21.00 | | 2.00 | | 4.00 | | 20.30 | 1.00 | 1.00 | | | 9.60 | | 0.10 | 850°C | 360 min | MgSiO3, MgTi2O5, Mg2SiO4 |
| 25 | 40.88 | 20.94 | | 1.99 | | 3.99 | | 18.54 | 1.00 | 1.00 | | 1.99 | 9.57 | | 0.10 | 850°C | 360 min | MgSiO3, MgTi2O5 |
| 26 | 42.24 | 20.63 | | | | 3.93 | | 19.94 | 0.98 | 0.98 | | | 6.29 | 4.91 | 0.10 | 850°C | 360 min | Mg2Al2Si3O12 |
| 27 | 42.12 | 20.57 | | | | 3.92 | | 18.22 | 0.98 | 0.98 | | 1.96 | 6.27 | 4.90 | 0.10 | 850°C | 360 min | Mg2Al2Si3O12 |
| 28 | 43.39 | 18.26 | 2.02 | | | 4.04 | | 20.48 | 1.01 | 1.01 | | | 9.69 | | 0.10 | 850°C | 360 min | MgSiO3, MgTi2O5 |
| 29 | 43.26 | 18.21 | 2.01 | | | 4.02 | | 18.71 | 1.01 | 1.01 | | 2.01 | 9.66 | | 0.10 | 850°C | 360 min | MgSiO3, MgTi2O5 |
| 30 | 44.36 | 17.65 | | | | 7.71 | | 16.68 | 0.96 | 0.96 | 2.31 | | 9.26 | | 0.10 | 850°C | 360 min | Mg2SiO4, Nepheline |
| 31 | 45.23 | 17.99 | | | | 3.93 | 1.97 | 17.01 | 0.98 | 0.98 | 2.36 | | 9.44 | | 0.10 | 850°C | 360 min | MgSiO3, Mg2SiO4 |
| 32 | 44.36 | 17.65 | | | 0.50 | 3.86 | 3.86 | 16.68 | 0.96 | 0.96 | 2.31 | | 9.26 | | 0.10 | 850°C | 360 min | Mg2SiO4 |
| 33 | 42.79 | 20.90 | | | | 3.98 | | 20.20 | 1.00 | 1.00 | | | 9.55 | | 0.10 | 850°C | 360 min | MgSiO3, Mg2SiO4, Nepheline |
| 34 | 42.57 | 20.79 | | | 0.99 | 3.96 | | 20.10 | 0.99 | 0.99 | | | 9.51 | | 0.10 | 850°C | 360 min | MgSiO3 |
| 35 | 43.00 | 21.00 | | | | 4.00 | | 20.30 | 1.00 | 1.00 | | | 9.60 | | 0.10 | 800°C | 360 min | MgSiO3 |
| 36 | 42.87 | 20.94 | | | | 3.99 | | 18.54 | 1.00 | 1.00 | | 1.99 | 9.57 | | 0.10 | 800°C | 360 min | MgSiO3 |
| Com. Ex. 1 | 52.70 | 16.00 | | | | | | 15.00 | 1.40 | 1.40 | 3.50 | | 9.00 | 0.80 | 0.20 | 950°C | 120 min | MgSiO3 |
| Com. Ex. 2 | 48.00 | 19.00 | | | | | | 18.00 | 1.00 | 1.00 | 2.50 | | 10.00 | | 0.50 | 850°C | 360 min | MgSiO3 |

TABLE 2

| Examples | Hv (before strengthening) | Hv (after strengthening ) | CS/MPa | DOL/μm | CT/MPa |
|---|---|---|---|---|---|
| 1 | 837 | 902 | 670 | 46 | 2.8 |
| 2 | 806 | 872 | 244 | 44 | 1.3 |
| 3 | 806 | 912 | 673 | 44 | 2.7 |
| 4 | 840 | 915 | 603 | 62 | 3.4 |
| 5 | 783 | 885 | 602 | 47 | 2.8 |
| 6 | 802 | 915 | 707 | 38 | 2.5 |
| 7 | 815 | 970 | 650 | 40 | 2.5 |
| 8 | 774 | 860 | 668 | 25 | 1.6 |
| 9 | 865 | 917 | 316 | 73 | 2.3 |
| 10 | 813 | 888 | | | |
| 11 | 848 | 885 | 241 | 53 | 1.7 |
| 12 | 749 | | | | |
| 13 | 871 | 902 | 222 | 35 | 0.8 |
| 14 | 895 | 934 | 198 | 35 | 0.7 |
| 15 | 865 | 914 | | | |
| 16 | 893 | 1020 | 621 | 68 | 3.4 |
| 17 | 870 | 995 | | | |
| 18 | 885 | 965 | 608 | 57 | 2.7 |
| 19 | 867 | 968 | 520 | 53 | 2.0 |
| 20 | 878 | 942 | 492 | 64 | 2.8 |
| 21 | 921 | 982 | 628 | 74 | 3.6 |
| 22 | 862 | 976 | | | |
| 23 | 900 | 963 | | | |
| 24 | 893 | 961 | | | |
| 25 | 850 | 946 | | | |
| 26 | 870 | 923 | | | |
| 27 | 854 | 963 | | | |
| 28 | 886 | 935 | | | |
| 29 | 883 | 919 | | | |
| 30 | 816 | | | | |
| 31 | 797 | | | | |
| 32 | 737 | | | | |
| 33 | 916 | | | | |
| 34 | 904 | | | | |
| 35 | 877 | 937 | 622 | 33 | 17.0 |
| 36 | 869 | 930 | 617 | 34 | 21.0 |
| Com. Ex. 1 | 834 | 799 | | | |
| Com. Ex. 2 | 863 | 836 | | | |

TABLE 3

| | Fracture toughness/MPa $m^{0.5}$ | |
|---|---|---|
| | Before strengthening | After strengthening |
| Example 19 | 0.91 | 3.4 |
| Example 22 | 0.91 | 3.9 |
| Com. Ex. 1 | 1.3 | 1.3 |

The documents described in this specification and the entire disclosure (including description, drawings, and claims) of the Japanese patent application specification, which is the basis for the priority of the present application under the Paris Convention, are incorporated herein by reference.

What is claimed is:

1. Crystallized glass, containing:
40.0 to 55.0% of a $SiO_2$ component;
10.0 to 30.0% of an $Al_2O_3$ component;
16.52 to 30.0% of a MgO component;
5.0 to 15.0% of a $TiO_2$ component;
3.82 to 8.0% of a $Na_2O$ component; and
a content of a ZnO component is 2.01% or less,
by mass % in terms of an oxide,
wherein the crystallized glass contain, as a main crystal
    phase, $MgSiO_3$ or solid solutions thereof.

2. The crystallized glass according to claim 1, containing:
0 to 5.0% of a $B_2O_3$ component;
0 to 5.0% of a $P_2O_5$ component;
0 to 4.0% of an $Li_2O$ component;
0 to 5.0% of a $K_2O$ component;
0 to 5.0% of a CaO component;
0 to 5.0% of an SrO component;
0 to 5.0% of a BaO component;
0 to 2.01% of a ZnO component;
0 to 8.0% of a $ZrO_2$ component; and
0 to 1.0% of an $Sb_2O_3$ component,
by mass % in terms of an oxide.

3. The crystallized glass according to claim 1, wherein the crystallized glass is strengthened glass having a compressive stress layer in a surface of the crystallized glass.

4. The crystallized glass according to claim 2, wherein the crystallized glass is strengthened glass having a compressive stress layer in a surface of the crystallized glass.

* * * * *